United States Patent [19]

Merkel et al.

[11] 4,393,509

[45] Jul. 12, 1983

[54] SOURCE-REGION ELECTROMAGNETIC PULSE SIMULATOR

[75] Inventors: George Merkel, Springfield, Va.; William D. Scharf, Silver Spring, Md.

[73] Assignee: The United States of America as represented by the Secretary of the Army, Washington, D.C.

[21] Appl. No.: 252,737

[22] Filed: Apr. 10, 1981

[51] Int. Cl.³ .............................................. G21G 3/04
[52] U.S. Cl. ..................................... 376/156; 434/218
[58] Field of Search ......................... 434/218; 378/119; 250/493.1; 376/156

[56] References Cited

U.S. PATENT DOCUMENTS

| 2,923,852 | 2/1960 | Scott et al. | 378/119 |
| 3,089,831 | 5/1963 | Kolb | 378/119 |
| 3,138,711 | 6/1964 | Batter, Jr. | 250/493.1 |
| 3,518,432 | 6/1970 | Uleski | 250/493.1 |
| 3,808,704 | 5/1974 | Frungel | 434/218 |

OTHER PUBLICATIONS

Aurora Facility (1978), pp. 1–19, published jointly by Defense Nuclear Agency and Harry Diamond Labs.

Primary Examiner—Sal Cangialosi
Attorney, Agent, or Firm—Robert P. Gibson; Anthony T. Lane; Saul Elbaum

[57] ABSTRACT

A method and apparatus for simulating, in conjunction with a source of ionizing radiation, intense pulsed electromagnetic fields and time varying conductivity caused by the gamma radiation associated with a nuclear detonation. An enclosed space, including the source of ionizing radiation is separated into three spaces, each space separated from the adjacent space by a gas impermeable, radiation permeable barrier. A guided wave structure, pulsed with high voltage pulses in conjunction with the firing of the source of ionization radiation is disposed adjacent to the barrier separating two of the spaces. A gas handling system is provided to introduce a selected non-ionizing gas and a selected ionizing gas into the spaces on either side of the barrier adjacent to the guided wave structure.

19 Claims, 6 Drawing Figures

SOURCE-REGION ELECTROMAGNETIC PULSE SIMULATOR

RIGHTS OF THE GOVERNMENT

The invention described herein may be manufactured, used or licensed by or for the Government of the United States of America for governmental purposes without payment to us of any royalties therefor.

BACKGROUND OF THE INVENTION

This invention relates generally to methods and devices which test the ability of equipment and especially electronic equipment, to survive a nuclear detonation. More specifically, this invention relates to a method and device which simulates, without a nuclear detonation, certain aspects of the environment produced by such a detonation. The environment in question is the source-region environment, i.e., the area close enough to an atmospheric burst that ionization of the air is an essential component. The environment is characterized by blast effects, thermal radiation, neutron radiation, gamma radiation, intense pulsed electromagnetic fields (EMP) and time varying (pulsed) air conductivity. The present invention simulates the aspects of gamma radiation, intense pulsed electromagnetic fields (EMP) and time varying (pulsed) air conductivity. In the vicinity of an atmospheric nuclear detonation, the EMP and air conductivity are caused by the gamma flux. Compton electrons, set into motion by the gamma rays, act as the sources of both local and radiated fields, and, in slowing down, lose energy through the ionization of air molecules. This ionization makes the air conductive.

There are several source region electromagnetic pulse (SREMP) simulators one of which is the AURORA Flash X-Ray Facility at the U.S. Army Electronics Research and Development Command, HARRY DIAMOND LABORATORIES located in Adelphi, Maryland. The AURORA is considered as a self-contained SREMP simulator but suffers from several severe limitations. In the AURORA, bremsstrahlung is produced in four thick tantalum targets by four synchronous 10-MeV electron beams. The bremsstrahlung then produces an EMP signal through the same mechanism as does a nuclear detonation. It induces Compton electron currents in the AURORA test chamber. As the Compton electrons are slowed down, they ionize the air and also produce an electromagnetic field in the chamber. However, the EMP produced in the AURORA is not a true model of the EMP produced by a nuclear detonation.

In both AURORA and a true SREMP environment, the early-time electromagnetic phenomena can be roughly considered as evolving in two successive phases:

a. the wave phase (when $\dot{D} >> \sigma E$, during the fast turn-on of the Compton drivers); and b. the diffusion phase (when $\sigma E >> \dot{D}$). During the wave phase, the spherical domain of influence (the volume, surrounding a field point, containing sources determining the fields at the field point) has radius $C(t-t_0)$, where C is the speed of light and the pulse begins at time $t_0$. During the diffusion phase, the radius of influence contracts as $\sigma$ increases, and when $\sigma$ levels off, the radius increases as $\sqrt{t}$ rather than linearly.

The limitations of the AURORA test facility as a nuclear EMP similator can be understood by examining its response in terms of the wave equation for the E and H fields. To simplify the examination it is assumed that the examination point is far enough away from the AURORA test cell "hot spot" (the source of radiation) so that a spatially homogeneous conductivity can be assumed. The two wave equations which express the electric and magnetic fields in terms of the Compton current J and charge density $\rho$:

$$\nabla^2 E - \mu \left( \frac{\partial \sigma}{\partial t} E + \sigma \frac{\partial E}{\partial t} + \epsilon \frac{\partial^2 E}{\partial t^2} \right) = \mu \frac{\partial J}{\partial t} + \frac{\nabla \rho}{\epsilon}$$

$$\nabla^2 H - \mu \left( \sigma \frac{\partial H}{\partial t} + \epsilon \frac{\partial^2 H}{\partial t^2} \right) = -\nabla \times J$$

using conventional notation. If it is assumed that the EMP that is to be simulated is in the diffusion phase, then $$\sigma E >> \epsilon_o \frac{\partial E}{\partial t}$$

Another assumption that can be made $$\frac{\partial \sigma}{\partial t} E << \sigma \frac{\partial E}{\partial t}$$

though not strictly valid leads to great simplification of the wave equations. However, a more thorough treatment involving the renormalization of time does justify the qualitative discussion presented. With these assumptions, the E and H fields inside the AURORA test cell are $$\nabla^2 E - \mu \left( \sigma \frac{\partial E}{\partial t} \right) = \mu \frac{\partial J}{\partial t} + \frac{\nabla \rho}{\epsilon}$$

and $$\nabla^2 H - \mu \left( \sigma \frac{\partial H}{\partial t} \right) = -\nabla \times J$$

Now, considering the diffusion Green function given by $$g(R, t, R_o, t_o) = \frac{4\pi}{(\mu\sigma)} (\mu\sigma)^{3/2} \exp - \left( \frac{\mu\sigma(R - \vec{R_o})^2}{4(t - t_o)} \right)$$

If a value of $\sigma = 3 \times 10^{-4}$ mho/m, 10-m from the hot spot, and a time equal to $10^{-7}$ seconds (roughly the FWHM of the AURORA pulse) is substituted in the Green function then $$\exp - \left| \frac{4\pi \times 10^{-7} \times 3 \times 10^{-4}}{4(10^{-7})} (R - R_0)^2 \right| -$$

$$\exp - | 3\pi \times 10^{-4}(R - R_0)^2 |$$

for the exponential factor. In other words, Compton drivers and charges within a spherical gaussian "domain of influence" of standard deviation 30 meters contribute to the local E and H fields in a tactical situation. The spatial distribution of source currents in the AURORA test cell has much too small an extension to generate a reasonable tactical EMP simulation. Another limitation of the AURORA test cell is that the metallic walls of the cell short-circuit the E field, an effect seen throughout the cell because of the relatively large skin depth of the ionized joint. A third limitation is that the radiation pulses rise-time (and hence the rise-times of the fields and conductivity) is too long. Because of these limitations of existing radiation sources a need for an auxiliary source of pulsed fields is needed. One approach has been to place a guided-wave structure in the test cell to provide a traveling electromagnetic pulsed wave. A large (12 m×4 m×3 m) transmission line has been mounted laterally in the AURORA test cell, see FIGS. 1 & 2 which represents prior art efforts in the AURORA. The line is driven by a 100 KV pulser which provides the appropriate propagating electric and magnetic fields. Simultaneously, AURORA is fired to provide a time-varying pulse of ionizing radiation. However, these two effects are not independent, resulting in a failure of the system to provide a true modeling of an actual nuclear detonation. The time-varying conductivity creates a varying load on the pulser-line system and thus distorts the voltage pulse, and consequently, the electric field inside the line (the test area). The fast-rising load current increases the magnetic field in the line, resulting in a negative voltage pulse and a falling E-field; and subsequently, as the load impedance rises again, the magnetic field energy continues to drive current into it, resulting in a positive voltage pulse and a rising and overshooting E-field. This overshooting effect is referred to as the inductive kick.

It is therefore one object of this invention to provide a method to simulate the electromagnetic pulse (EMP) created in the near vicinity of a nuclear detonation.

It is another object of this invention to provide a method to simulate the electromagnetic pulse (EMP) created in the near vicinity of a nuclear detonation that can be utilized in conjunction with a source of time-varying pulses of ionizing radiation.

It is a further object of this invention to provide an apparatus to simulate the electromagnetic pulse (EMP) created in the near vicinity of a nuclear detonation.

It is still a further object of the invention to provide an apparatus to simulate the electromagnetic pulse (EMP) created in the near vicinity of a nuclear detonation that can be utilized in conjunction with a source of time-varying pulses of ionizing radiation.

SUMMARY OF THE INVENTION

These and other objects, features and advantages of the invention are accomplished by a method and apparatus for simulating, in conjunction with a source of ionizing radiation, intense pulsed electromagnetic fields and time varying conductivity caused by the gamma radiation associated with a nuclear detonation. An enclosed space, including the source of ionizing radiation is separated into three spaces, each space separated from the adjacent space by a gas impermeable, radiation permeable barrier. A guided wave structure, pulsed with high voltage pulses in conjunction with the firing of the source of ionizing radiation is disposed adjacent to the barrier separating two of the spaces. A gas-handling system is provided to introduce a selected non-ionizing gas and a selected ionizing gas into the spaces on either side of the barrier adjacent to the guided wave structure. Also provided are field-shaping busbars for shaping the electromagnetic fields in one of the spaces.

BRIEF DESCRIPTION OF THE DRAWINGS

The above and further objects and novel features of the invention will more fully appear from the following description when the same is read in connection with the accompanying drawings. It is to be understood, however, that the drawings are for the purpose of illustration only, and are not intended as a definition of the limits of the invention.

DESCRIPTION OF THE PREFERRED EMBODIMENT

Figure 1:
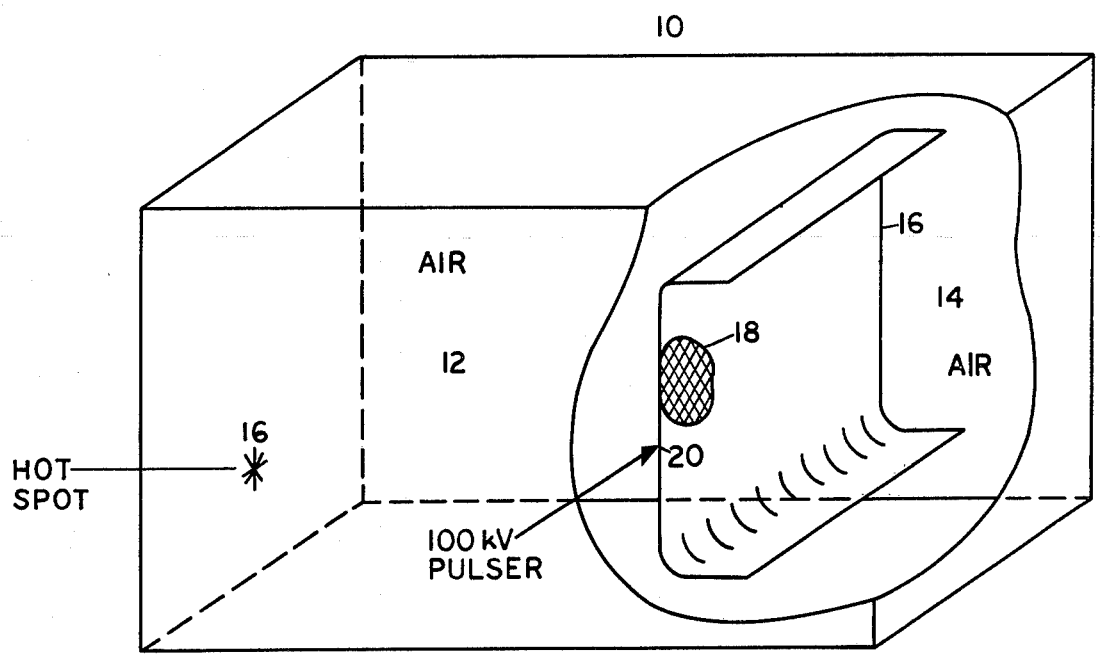
FIGS. 1 & 2 illustrate a prior art device.
Figure 2:
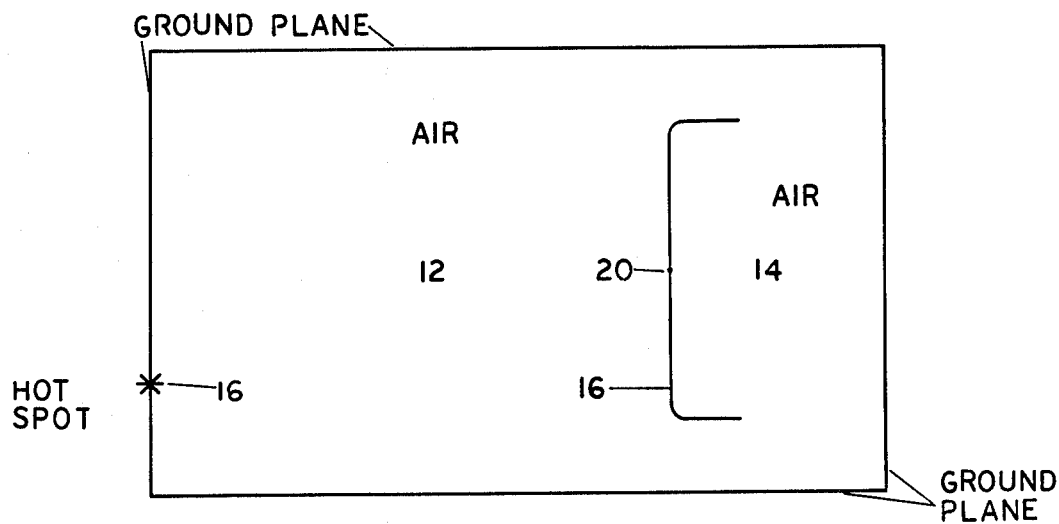

Referring now to the drawings, FIGS. 1 and 2 represent a prior art device, which is considered a self-contained source region electromagnetic pulse (SREMP) simulator. The AURORA test cell, generally at 10, comprises an inclosed space filled with air divided into a first space and a second space 14 which is used as a test space wherein equipment to be tested is placed. Ionizing radiation is produced at one end of the test cell 10 and is represented at 16. In the case of the Aurora, bremsstrahlung is produced in four thick tantalum targets by four synchronous 10-MeV electron beams. The bremsstrahlung then produces an EMP signal through the same mechanism as does a nuclear detonation. It induces Compton electron currents in the AURORA test chamber 12, 14. As the Compton electrons are slowed down, they ionize the air and also produce an electromagnetic field in the chamber. The walls of the test cell 10 represent ground planes. Space 12 and space 14 are roughly separated by a guided-wave structure 16. The guided-wave structure 16 is made of a conductive mesh, represented at 18, which can accomodate a high voltage electromagnetic pulsed wave. The guided-wave structure, also called a transmission line, is driven by a 100 kv pulser (not shown) represented at 20, which provides the appropriate propagating electric and magnetic fields.

Figure 3:
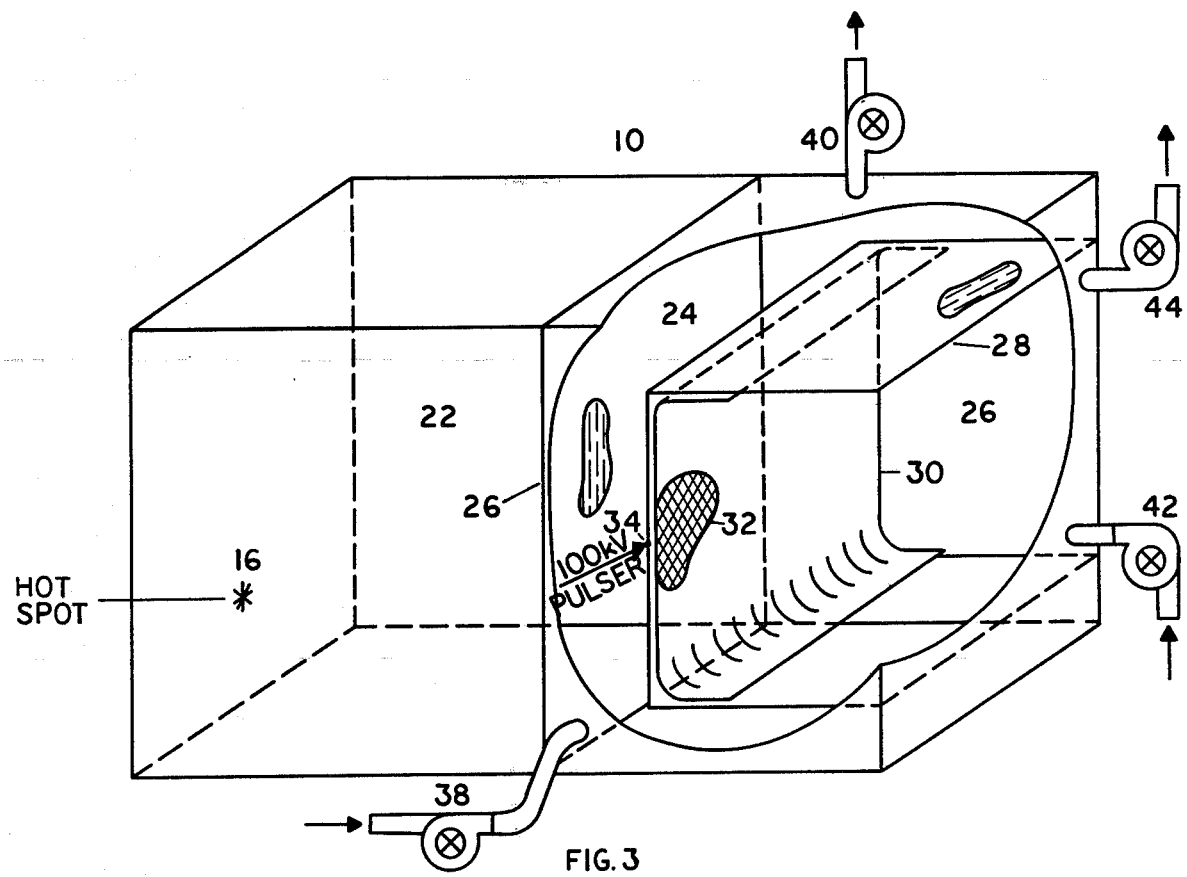
FIGS. 3 & 4 illustrate an embodiment of the present invention.
Figure 4:
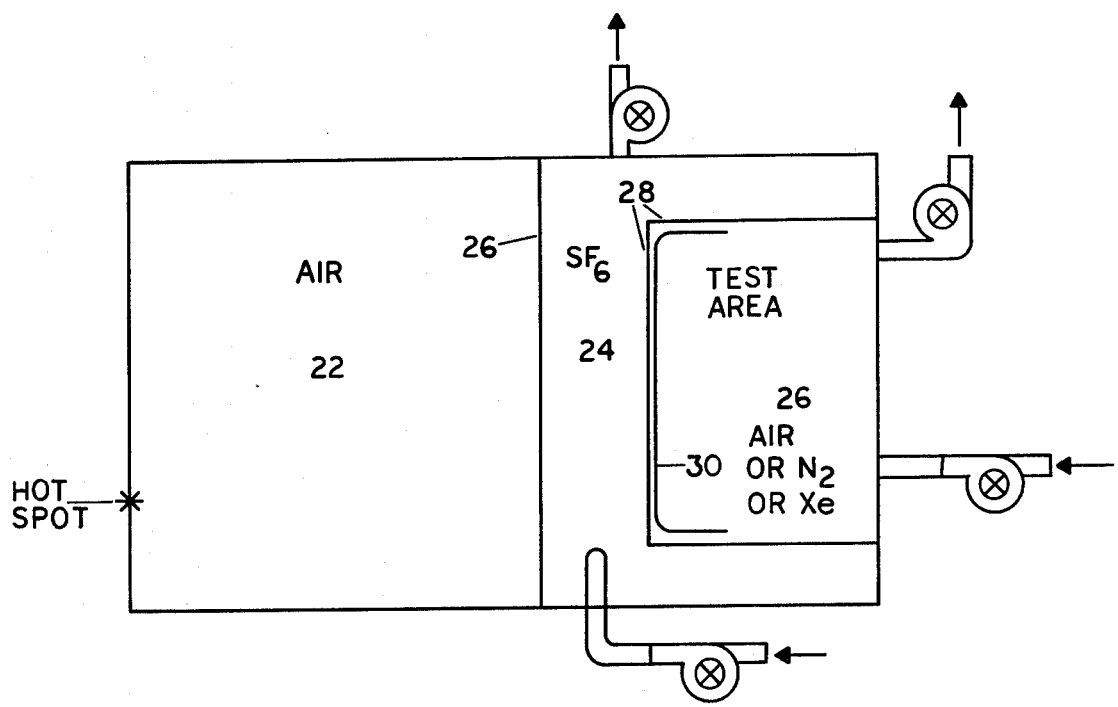

FIGS. 3 and 4 represent a first embodiment of the present invention. The AURORA test cell 10, the ionizing radiation source 16 and the walls representing ground planes are as described in the discussion associated with FIGS. 1 and 2. The enclosed space within the test cell is separated into three spaces, a first space 22, a second space 24 and a third space 26. Space 22 and 24 are separated by a gas impermeable, radiation permeable barrier 26. Space 24 and 26 are likewise separated by a gas impermeable radiation permeable barrier 28. Space 24 and space 26 are roughly separated by a guided-wave structure 30. The guided-wave transmission line 30 is made of a conductive material, preferrably a mesh or screen like material, represented at 32, which can accomodate a high voltage electromagnetic pulsed wave. The guided-wave structure is driven by a 100 kv pulser (not shown) represented at 34, which provides the appropriate propagating electric and magnetic fields. Gas handling means are provided to control the type of gas in spaces 24 and 26. For example, pump 38 inputs a selected gas into space 24 and exhaust pump 40 exhausts unwanted gases from space 24. Likewise pump 42 inputs a selected gas into space 26 and exhaust pump 44 exhausts unwanted gases from space 26.

Figure 5:
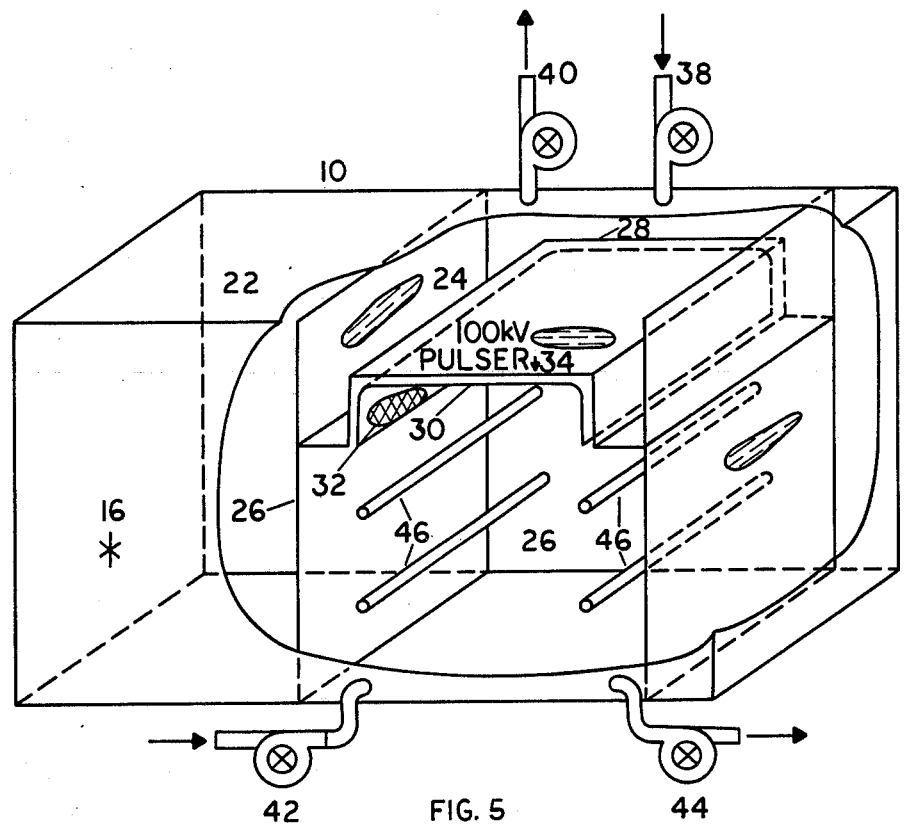
FIGS. 5 & 6 illustrate an alternate embodiment of the present invention.
Figure 6:
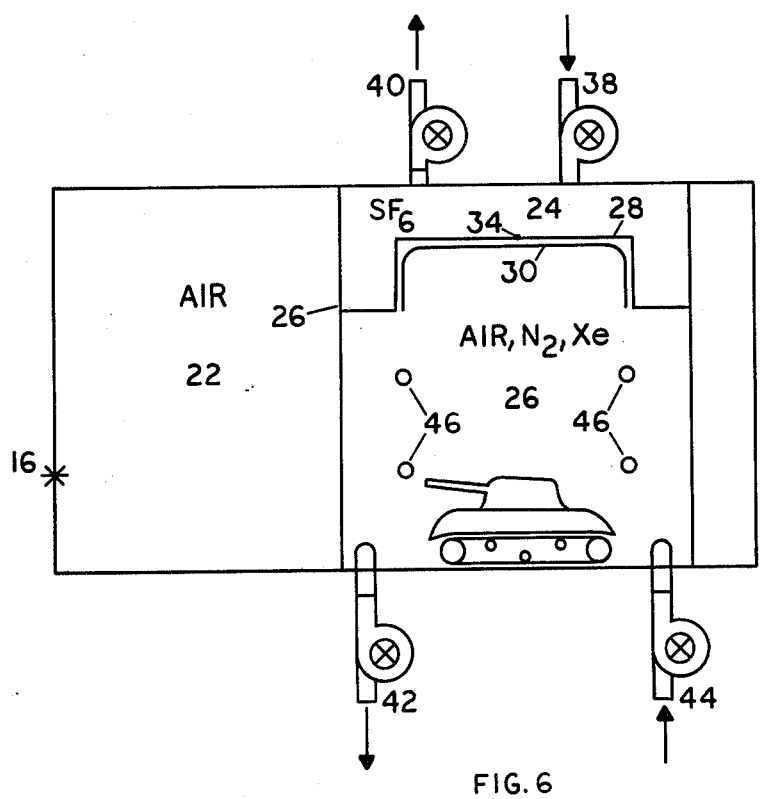

FIGS. 5 and 6 represents an alternate embodiment of the present invention. Like numerals represent like components shown in FIGS. 3 and 4. This embodiment shows the spaces 24 and 26 rearranged within the test cell and FIG. 6 graphically illustrates one use of the test cell, i.e., a representation of a tank and its equipment being tested for nuclear effects. Also shown in this embodiment are field shaping bushbars 46 which are used to adjust the fields produced within the test cells. Appropriate voltage sources (not shown) are used to apply a voltage to the bushbars 46 and are within the known state-of-the-art.

The operation of the present invention will be described in conjunction with the FIGS. representing the prior art and the embodiments of the present invention. As described above FIGS. 1 and 2 represent prior art devices, for use in the AURORA Flash X-Ray Facility at the U.S. Army Electronics Research and Development Command, Harry Diamond Laboratories at Adelphi, MD. Theoretically, the most straight forward simulator would be one that produced the appropriate gamma pulse and spectrum over the appropriate volume, and the proper fields and conductivity would follow. However, the AURORA and other test facilities are insufficient for three reasons (1) its pulse rise is too slow by about a factor of ten, (2) the irradiated volume (20 m×15 m×5 m) is too small and (3) the metal walls of the test cell reduce the fields by shorting them out. Because of these limitations there is a requirement for an auxiliary source of pulsed fields. Ideally, the conductivity would be provided by the ionizing radiation pulse, the pulsed fields would be provided by the auxiliary pulser and the two could be regarded as independent of each other. To properly simulate coupling to relatively large systems, a traveling electromagnetic pulsed wave is required. A large guided-wave structure such as a transmission line has been provided in the AURORA. This is represented by 16 in FIGS. 1 and 2. The transmission line 16 is mounted laterally in the AURORA test cell 10 and is driven by a 100 kv pulser, represented at 20. Simultaneously, the ionizing radiation source 16 is fired to provide a time-varying pulse of ionizing radiation. However, it has been found that these two effects are not independent. The time-varying conductivity creates a varying load on the pulser-line system and thus distorts the voltage pulse, and consequently the electric field within the test area 14. The fast-rising load current increases the magnetic field in the line, resulting in a negative voltage pulse and a falling E-field; and subsequently, as the load impedance rises again, the magnetic field energy continues to drive current into it, resulting in a positive voltage pulse and a rising and overshooting E-field which is referred to as the "inductive kick". This field distortion, since it depends on changes in current, is proportional to the relative change and rate of change, during the radiation pulse, of the load resistance, i.e., it is related to the air conductivity. It is not desired to entirely eliminate the change in load resistance since the change in air conductivity is an essential feature of the environment to be simulated. However, the effect upon the system can be minimized by allowing only the test area to be ionized. To effectuate this requires two parallel transmission lines, a master line which comprises the test area 14 and a slave line which is prohibited from experiencing the ionization which decreases the degrading effect upon the system. The present invention minimizes the relative change in loading by making the slave-line impedance as low as possible. Then, since only the master-line impedance is time-varying, the time-variance of the parallel combination is minimized, according to the formula:

$$Z(t) = \frac{Z_s Z_m(t)}{Z_s + Z_m(t)}$$

then $Z'(t) = \frac{dZ}{dZ_m} Z'_m(t) = \left(\frac{Z_s}{Z_s + Z_m}\right)^2 Z'_m(t)$ The simulator of the present invention utilizes the diverse behavior of specific gases when exposed to ionizing radiation. The simulator as shown in FIGS. 3–6 has the interior space separated into chambers or spaces 24, 26 and a gas-handling system by which the chambers or spaces can be exhausted and filled with selected gases. Among the most important microscopic parameters by which gases can be characterized are atomic number, photon range, electron range, electron elastic and inelastic cross-sections, electron attachment rate, electron-ion and ion-ion recombination rates, avalanching rates, electron mobilities, and ion mobilities. For example, $SF_6$ and $O_2$ have high electron attachment rates, and hence are not strongly ionized; $N_2$ has a low attachment rate and is strongly ionized; $CO_2$ has high inelastic electron cross-sections so that electrons thermalize fast, inhibiting avalanching, gases with high atomic numbers have low photon ranges and hence tend to become quite conductive; inert gases (rotationally symmetric molecules) have Ramsauer-Townsend "transparencies" at about 0.7 eV which dominate the thermalization process.

The preferred embodiment utilizes $SF_6$ as the non-ionizing gas in space 24 and either air, $N_2$ or Xe as the ionizing gas in space 26. The selection of gases provides considerable flexibility and control over the loading of the line and the conductivity wave form in the test space.

An important feature of the master-slave line, as compared to the prior art system, is that, due to the lower impedance of the double line, much more energy is drawn from the pulser in order to serve the same test space. Most of this energy is consumed in the slave line, where the fields are not used directly for simulation, but serve the purpose of maintaining the line voltage at its proper value. The achievement of greater EMP waveform fidelity is obtained at the cost of more stringent pulser requirements.

There is a limiting conductivity beyond which, for desired waveforms with frequency content above a certain level, the present invention becomes inappropriate. This is due to the self-sheilding effect which arises whenever conduction current dominates displacement current and the medium becomes primarily diffusive. Under these conditions the fields at a point are determined by source currents and charge densities only within a sphere of influence whose radius is approximately given by the diffusion length:

$$R \approx \sqrt{\frac{\tau}{\mu \sigma}}$$

where T is a "time of interest", say 100 ns. When this radius is of the order of the transmission line dimensions, the line no longer functions as desired. However, below this limit the present invention closely approximates the EMP of an actual nuclear detonation.

While the invention has been described with reference to the accompanying drawings, it is to be clearly understood that the invention is not to be limited to the particular details shown therein as obvious modifications may be made by those skilled in the art. The embodiments of the invention should only be construed within the scope of the following claims.

What we claim is:

1. A method of simulating, in conjunction with a source of ionizing radiation, intense pulsed electromagnetic fields and time varying air conductivity caused by the gamma radiation associated with a nuclear detonation comprising the steps of:
enclosing a space, said space including said source of ionizing radiation;
dividing said space into a first space, a second space and a third space;
separating said first space from said second space by a first gas impermeable, radiation permeable barrier;
separating said second space from said third space by a second gas impermeable, radiation permeable barrier;
providing a guided wave structure adjacent to said second gas impermeable, radiation permeable barrier;
introducing a selected non-ionizing gas into said second space; and
pulsing said guided wave structure with a high voltage pulser.

2. A method of simulating, in conjunction with a source of ionizing radiation, intense pulsed electromagnetic fields and time varying air conductivity caused by the gamma radiation associated with a nuclear detonation as recited in claim 1 further comprising the step of introducing a selected ionizing gas into said third space.

3. A method of simulating, in conjunction with a source of ionizing radiation, intense pulsed electromagnetic fields and time varying air conductivity caused by the gamma radiation associated with a nuclear detonation as recited in claim 2 wherein said guided wave structure is constructed of a conductive mesh.

4. A method of simulating, in conjunction with a source of ionizing radiation, intense pulsed electromagnetic fields and time varying air conductivity caused by the gamma radiation associated with a nuclear detonation as recited in claim 3 wherein said step of pulsing said guided wave structure with a high voltage pulser is accomplished in conjunction with the firing of said source of ionizing radiation.

5. A method of simulating, in conjunction with a source of ionizing radiation, intense pulsed electromagnetic fields and time varying air conductivity caused by the gamma radiation associated with a nuclear detonation as recited in claim 4 wherein said step of introducing a selected non-ionizing gas into said second space is accomplished by exhausting said second space of gases and pumping said selected non-ionizing gas into said second space.

6. A method of simulating, in conjunction with a source of ionizing radiation, intense pulsed electromagnetic fields and time varying air conductivity caused by the gamma radiation associated with a nuclear detonation as recited in claim 5 wherein said step of introducing a selected ionizing gas into said third space is accomplished by exhausting said third space of gases and pumping the selected ionizing gas into said third space.

7. A method of simulating, in conjunction with a source of ionizing radiation, intense pulsed electromagnetic fields and time varying air conductivity caused by the gamma radiation associated with a nuclear detonation as recited in claim 6 further comparing the step of shaping the electromagnetic field in said third space.

8. A method of simulating, in conjunction with a source of ionizing radiation, intense pulsed electromagnetic fields and time varying air conductivity caused by the gamma radiation associated with a nuclear detonation as recited in claim 7 wherein said non-ionizing gas introduced into said second space is $SF_6$.

9. A method of simulating, in conjunction with a source of ionizing radiation, intense pulsed electromagnetic fields and time varying air conductivity caused by the gamma radiation associated with a nuclear detonation as recited in claim 8 wherein said ionizing gas is selected from the group consisting of air, $N_2$ and Xe.

10. An apparatus for simulating, in conjunction with a source of ionizing radiation, intense pulsed electromagnetic fields and time varying air conductivity caused by the gamma radiation associated with a nuclear detonation, comprising:
an enclosed space, said space including said source of ionizing radiation;
means for dividing said space into a first space, a second space and a third space;
a first gas impermeable, radiation permeable barrier separating said first space from said second space;
a second gas impermeable, radiation permeable barrier separating said second space from said third space;
a guided wave structure adjacent to said second gas impermeable, radiation permeable barrier;
means for introducing a selected non-ionizing gas into said second space; and
means for pulsing said guided wave structure with high voltage pulses.

11. An apparatus for simulating, in conjunction with a source of ionizing radiation, intense pulsed electromagnetic fields and time varying air conductivity caused by the gamma radiation associated with a nuclear detonation as recited in claim 10 further comprising means for introducing a selected ionizing gas into said third space.

12. An apparatus for simulating, in conjunction with a source of ionizing radiation, intense pulsed electromagnetic fields and time varying air conductivity caused by the gamma radiation associated with a nuclear detonation as recited in claim 11 wherein said guided wave structure is constructed of a conductive mesh.

13. An apparatus for simulating, in conjunction with a source of ionizing radiation, intensed pulsed electromagnetic fields and time varying air conductivity caused by the gamma radiation associated with a nuclear detonation as recited in claim 12 wherein said means for pulsing said guided wave structure is pulsed in conjunction with said source of ionizing radiation.

14. An apparatus for simulating, in conjunction with a source of ionizing radiation, intense pulsed electromagnetic fields and time varying air conductivity caused by the gamma radiation associated with a nuclear detonation as recited in claim 13 wherein said means for introducing a selected non-ionizing gas into said second space comprises an exhaust pumping system and an input pumping system.

15. An apparatus for simulating, in conjunction with a source of ionizing radiation, intense pulsed electromagnetic fields and time varying air conductivity caused by the gamma radiation associated with a nuclear detonation as recited in claim 14 wherein said means for introducing a selected ionizing gas into said third space comprises a second exhaust pumping system and a second input pumping system.

16. An apparatus for simulating, in conjunction with a source of ionizing radiation, intense pulsed electromagnetic fields and time varying air conductivity caused by the gamma radiation associated with a nuclear detonation as recited in claim 15 further comprising means for shaping the electromagnetic field in said third space.

17. An apparatus for simulating, in conjunction with a source of ionizing radiation, intense pulsed electromagnetic fields and time varying air conductivity caused by the gamma radiation associated with a nuclear detonation as recited in claim 16 wherein said means for shaping the electromagnetic field in said third space comprises field-shaping busbars.

18. An apparatus for simulating, in conjunction with a source of ionizing radiation, intense pulsed electromagnetic fields and time varying air conductivity caused by the gamma radiation associated with a nuclear detonation is recited in claim 17 wherein said non-ionizing gas comprises $SF_6$.

19. An apparatus for simulating, in conjunction with a source of ionizing radiation, intense pulsed electromagnetic fields and time varying air conductivity caused by the gamma radiation associated with a nuclear detonation as recited in claim 18 wherein said ionizing gas is selected from the group consisting of air, $N_2$ and Xe.

* * * * *